United States Patent
Le Besnerais

(10) Patent No.: US 8,847,458 B2
(45) Date of Patent: Sep. 30, 2014

(54) ELECTRICAL MACHINE, IN PARTICULAR AN ELECTRICAL GENERATOR

(75) Inventor: Jean Le Besnerais, Mons en Baroeul (FR)

(73) Assignee: Siemens Aktiengesellschaft, Munich (DE)

(*) Notice: Subject to any disclaimer, the term of this patent is extended or adjusted under 35 U.S.C. 154(b) by 201 days.

(21) Appl. No.: 13/396,933

(22) Filed: Feb. 15, 2012

(65) Prior Publication Data

US 2012/0217750 A1   Aug. 30, 2012

(30) Foreign Application Priority Data

Feb. 28, 2011   (EP) .................................. 11156219

(51) Int. Cl.
*H02K 3/12* (2006.01)
*H02K 7/18* (2006.01)

(52) U.S. Cl.
CPC ............... *H02K 3/12* (2013.01); *Y02E 10/725* (2013.01); *H02K 7/1838* (2013.01)
USPC .......................................... 310/201; 310/208

(58) Field of Classification Search
USPC ...................................... 310/201, 208; 290/55
See application file for complete search history.

(56) References Cited

U.S. PATENT DOCUMENTS

| | | | |
|---|---|---|---|
| 4,868,970 A | | 9/1989 | Altizer |
| 5,313,127 A | * | 5/1994 | Danley et al. ................... 310/36 |
| 5,394,046 A | * | 2/1995 | Dolgas .................. 310/216.002 |
| 5,744,896 A | * | 4/1998 | Kessinger et al. ............. 310/268 |
| 6,229,241 B1 | * | 5/2001 | Ishigami et al. .............. 310/208 |
| 6,252,327 B1 | * | 6/2001 | Matsuzaki .................... 310/201 |
| 6,894,418 B2 | * | 5/2005 | Jones et al. ................... 310/208 |
| 7,990,013 B2 | * | 8/2011 | Seo et al. ............... 310/216.002 |
| 8,093,777 B2 | * | 1/2012 | Stiesdal ........................ 310/198 |
| 8,174,160 B2 | * | 5/2012 | Stiesdal ........................ 310/198 |
| 8,461,738 B2 | * | 6/2013 | Clark ........................... 310/180 |
| 2008/0010812 A1 | * | 1/2008 | Clark .............................. 29/605 |
| 2010/0066195 A1 | * | 3/2010 | Stiesdal ........................ 310/198 |
| 2010/0225193 A1 | * | 9/2010 | Clark ........................... 310/208 |

FOREIGN PATENT DOCUMENTS

| | | |
|---|---|---|
| EP | 2166644 A1 | 3/2010 |
| EP | 2226923 A1 | 9/2010 |

* cited by examiner

*Primary Examiner* — Quyen Leung
*Assistant Examiner* — Naishadh Desai

(57) ABSTRACT

An electrical machine includes an armature and at least one field magnet arrangement separated by a gap from each other. The armature and/or the field magnet arrangement include a plurality of coils. Each coil includes conductive body sections. The body sections of the coils are joined electrically by conductive end sections. At least one of the end sections of at least one coil of the armature is tilted in a direction away from the armature towards the field magnet arrangement and/or at least one of the end sections of at least one coil of the field magnet arrangement is tilted in a direction away from the field magnet arrangement towards the armature. The electrical machine may be used in a wind turbine to generate electrical power.

14 Claims, 5 Drawing Sheets

S1: W1 → W2 → W3 → W1 → W2 → ...
S2: W2 → W3 → W1 → W2 → W3 → ...
S3: W3 → W1 → W2 → W3 → W1 → ...

ELECTRICAL MACHINE, IN PARTICULAR AN ELECTRICAL GENERATOR

CROSS REFERENCE TO RELATED APPLICATIONS

This application claims priority of European Patent Office application No. 11156219.5 EP filed Feb. 28, 2011. All of the applications are incorporated by reference herein in their entirety.

FIELD OF INVENTION

The invention concerns an electrical machine, in particular an electrical generator. The invention further concerns an armature and/or field magnet arrangement for such an electrical machine, a wind turbine with such an electrical machine and the use of such an electrical machine as generator.

BACKGROUND OF INVENTION

Inefficiency of electrical machines comes primarily from electromagnetic losses (joule losses, iron losses, . . . ) in which energy is dissipated as heat. In permanent magnet generators, for example, these losses mainly come from copper losses in stator conductors, resulting in high temperature in the coils of the electric machine and especially in the end-windings that extend beyond the outer edges of the stator and are surrounded by air. In the coils and in the end windings joule losses are transformed to thermal energy causing heating up the stator. The joule losses are increasing with the length of the coils and of the end-windings. The stator winding temperature must be kept low enough to avoid damaging the insulation lifetime, so an efficient cooling system is of prime importance.

It is therefore important to minimize the winding overhang length in order to increase the machine efficiency and reduce the cooling system size.

For a large armature such as the rotor or stator of a wind turbine, the coil windings are generally quite thick and heavy owing to the physical dimensions of the generator and the high currents induced. The windings can be made of thick wire such as a multi-stranded wire, which is then wound onto the armature, usually the stator. To this end, the armature is usually made with multiple parallel slots arranged axially along the outside for accommodating the windings. Instead of wrapping the wire onto the armature, pre-shaped windings can be formed and inserted or 'dropped into' the slots of the armature. Such a pre-shaped winding generally comprises a closed loop comprising a "go" section and a "return" section held in two neighbouring stator or rotor slots. A coil comprises a plurality of such windings connected in series or parallel, and the connection is usually made at one end of the armature where the windings extend beyond the ends of the slots. As will be known to the skilled person, successive windings of a coil can be connected by allowing a strand of a multi-stranded wire to extend from one winding of a coil to the next winding of that coil, or by connecting windings of a coil to a bus bar arranged circumferentially about the stator, or in any other appropriate manner.

A multi-phase generator has the same number of coils as phases. Here, the windings are placed in the slots such that the slots for the "go" and "return" sections of one particular winding of a coil enclose or flank a number of slots for the "go" and "return" sections of the remaining coils. The windings of the different coils must overlap in some way at the stator ends.

Therefore different windings types are provided with different end sections designs. A first winding type is a straightforward closed loop, and the end section of this winding type comprises a 180° fold. A second winding type has an end section that does not extend as far beyond the stator end as the first winding type, but makes an approximately 45° tilt before being folded back on itself. A third winding type has an end section that also does not extend as far beyond the armature end as the first winding type and makes an approximately 90° tilt before being folded back on itself. These different end-sections or overhangs allow the windings to be placed into the armature slots in a straightforward manner.

Further, it is also known that the first and the second end sections are provided with 90° tilts and the third end section comprises no tilt.

Both of these end section designs which allowing an uncomplicated winding assembly result in an increasing overhang length that results in an undesirable decrease of the efficiency of the machine.

SUMMARY OF INVENTION

It is therefore an object of the invention to provide an electrical machine with an improved end section design.

The object of the invention is achieved by the features of the independent claims.

According to the invention, an electrical machine, particularly electrical generator, with an armature and a field magnet arrangement separated by a gap from each other, whereby the armature and/or the field magnet arrangement comprises a plurality of coils.

An armature for a generator comprises a plurality of coils, wherein the coils are arranged or 'wound' on the armature according to such a winding arrangement. Here, the term 'wound' is used in the established sense, even though the windings of a large armature are generally too thick and heavy to be flexible. Each coil comprises conductive body sections, whereby the body sections of the coils are joined electrically by conductive end sections. These body sections could be inserted in slots of the armature and/or field magnet arrangement. The end sections are not contained in the slots but extend beyond the outer edges in the direction of the slots to a length known as the "overhang length".

The field magnet arrangement could also comprise coils. These coils generate a magnetic field when an electric current flows through the coils, and such forming an electro magnetic field arrangement. Such an embodiment may be used in a generator as well as in a motor. Alternatively the field magnet arrangement could comprise permanent magnets, which is usually the case in generators for wind turbines.

According to the invention at least one of the end sections of at least one coil of the armature is tilted in a direction away from the armature towards the field magnet arrangement or at least one of the end sections of at least one coil of the field magnet arrangement is tilted in a direction away from the field magnet arrangement towards the armature. This allows overhang length to be reduced, especially of the length of end section without a bent. Accordingly the overhang can designed more compact and the efficiency of the electrical machine is increased. Furthermore, the overhang length of the electrical machine can be reduced, and therefore also the weight of the electrical machine. Also the cooling of the electrical machine can be reduced since joule losses caused in the end-windings are reduced.

The field magnet arrangement could be the rotor or the stator. Accordingly, the armature of the electric machine can be the stator or the rotor, depending on the way in which the electric machine—for example a generator—is constructed. Usually, however, particularly in large generators, it is the stator that is constructed to be the armature carrying the coil windings. In the following, therefore, but without restricting the invention in any way, it is assumed the electrical machine is a generator and that the stator carries the armature coils.

Further, without restricting the invention in any way, it is assumed that the field magnet arrangement comprises permanent magnets which are mounted on the rotor, although the invention would be equally applicable to a realisation in which the permanent magnets are mounted on the stator. Here, the term 'surface of the rotor' is to mean the appropriate surface of the rotor to which the permanent magnets are attached. For an electrical machine with the rotor on the outside, enclosing the stator, the permanent magnets will generally is mounted on the interior surface of the rotor to face the stator across a gap. For an electrical machine with the rotor on the inside and the stator on the outside, the permanent magnets will generally be mounted on the exterior surface of the rotor to face the stator across the gap. Permanent magnets are generally rectangular in shape and are attached along their length on the surface of the rotor in a direction parallel to the rotational axis of the rotor.

A wind turbine according to the invention comprises a rotor with a number of rotor blades, which rotor is connected to such an electrical machine, namely generator, according to the invention. The rotor and the generator may be carried by a nacelle mounted at the upper end of a tower of the wind turbine, as usual.

The method comprises the usage of an electrical machine as a generator of a wind turbine.

Particularly advantageous embodiments and features of the invention are given by the dependent claims, as revealed in the following description. Thereby, features revealed in the context of the electrical machine may also be realized in the context of the method of control of an electrical machine.

The electrical machine could have one or more phases, and therefore one or more coils. In a preferred embodiment the electrical machine comprises a first coil with at least one end section, a second coil with at least one second end section and a third coil with at least one third end section, whereby only the second end section tilts towards the field magnet arrangement or towards the armature. This results in an optimal overhang design, using with a minimum space for the end sections.

The end sections could be tilted in the same direction. In a preferred embodiment at least another end section of a coil of the armature is tilted away from the field magnet arrangement and/or at least another end section of a coil of the field magnet arrangement is tilted in a direction away from the armature. This allows neighbouring end sections of the coils of the armature to be accommodated in different directions, namely in the space in the direction away and in the space towards the field magnet arrangement. For example, a first group of end sections could be tilted away of the field magnet arrangement a second group of end sections could be tilted towards the field magnet arrangement, and a third group of end sections is no tilted. In this may, the space is used in an optimised manner and the overhang length can be further reduced. Accordingly, it may be possible to accommodate neighbouring end sections of the coils of the field magnet arrangement in different directions too, namely in the space in the direction away and in the space towards the armature, if applicable.

The end sections could tilt by different angles. A simple design for an electrical machine could be achieved when only a second end section and only a third end section are tilted with the same amount of angle in respect to the body sections.

Further, such an electrical machine is easy to fabricate since only coils with one kind of tilt and without tilts are need.

The end sections of the coils could be tilted at different angles. A very compact overhang design could be achieved, when the angle by which the third end section is tilted at the same angle by which the second end section is tilted since in this way both the space beyond the body sections and between the body and the axis of rotation is used effectively.

It is possible that every end section is tilted relative to its body section. In a preferred embodiment, therefore, at least one end section is essentially in line with its body sections, i.e. it is folded back without any tilt forming a zero-degree tilt. That means that one end section has no tilt. This reduces the amount of material needed for the end sections and results in a lighter electrical machine and less overhang losses.

One end section could be tilted with an angle between 0° and 90°, for example 30°, 45° or 60°, in respect to the body sections. Accordingly, the tilt is directed towards the axis of rotation forming an up-tilt. This could also be achieved by tilts over 90°, for example 120°. In a preferred embodiment at least one end section tilts by essentially 90° with respect to the body sections. Such 90° tilts are easy to fabricate by bending. Therefore the fabrication of such an electrical machine is facilitated. Furthermore, such 90° tilts allows a most compact arrangement of the end sections and the shortest overhang length with minimized overhang losses.

Further, other end sections could be tilted with an angle between 0° and −90° in respect to the body sections. Accordingly the tilt is directed in a direction towards the axis of rotation forming a down-tilt. In a preferred embodiment one end section tilts by essentially −90° with respect to the body sections. This facilitates the fabrication, too, since only end sections with 90° tilts are need, whereby the end sections are simply turned by 180° to form a −90° tilt before placing them in the stator and/or rotor.

The end sections of a coil could have any appropriate shape. A simple and easy to fabricate shape for the end section is a U-shaped end section, whereby each end of the U-shaped end section is electrically connected to a body section of that coil.

An electrical machine with an improved efficiency can be obtained when the armature comprises at least one recess for accommodating at least one on the end sections. In this recess the end sections having an up-tilt are accommodated. This allows the air gap between the armature and the field magnet arrangement to be reduced and therefore the efficiency of the electrical machine can be increased.

Such an electrical machine could be fabricated by assembling the field magnet arrangement inside the armature, or by assembling the armature around the field magnet arrangement. The assembly could be facilitated when the armature has a first end and a second end, and the coils are arranged axially on an outside surface of the armature such that one end section of a coil extends beyond the first end of the armature is tilted in a direction away from the armature towards the field magnet arrangement and such that the other one end section of the same coil extends beyond the second end of the armature is tilted in a direction away from the field magnet arrangement or has no tilt. For example, only the first end is equipped with up-tilts, and the second end is equipped with zero-tilts and/or with down tilts, but not with up-tilts. This allows inserting the armature or field magnet arrangement with such a winding arrangement through an opening at one end of the electrical machine. Accordingly the armature and the field magnet arrangement could be fabricated separately.

The end section at the second end of the coils could comprise end sections that are tilted with angles between 0° and 90° for facilitating the fabrication. In a preferred embodiment the second end is equipped with end sections tilt by essentially 45° with respect to the body sections.

The electrical machine could have an internal rotor and an external stator. For such a design collector rings are necessary. Preferably, the electrical machine is equipped with an external rotor as field magnet arrangement and an internal stator as armature. Since the external rotor can be equipped with permanent magnets, a very simple design for the electrical machine is possible since no collector rings are necessary to power electrical magnets producing the generator field.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF THE EMBODIMENTS

Figure 1:
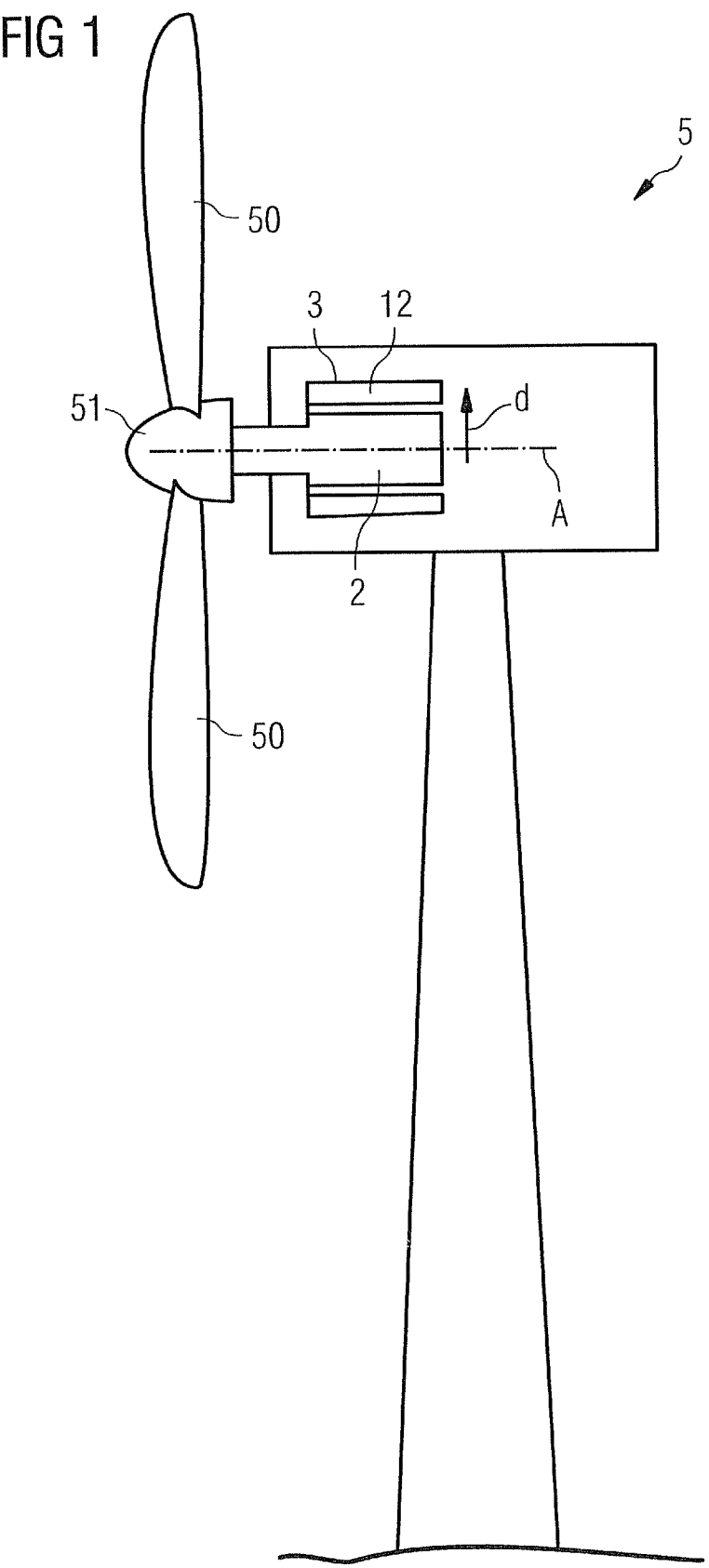
FIG. 1 shows a schematic representation of a generator in a wind turbine.

FIG. 1 shows a very simplified representation of a generator 4 with an internal stator 2 and an external rotor 3 in a wind turbine 5. For the sake of simplicity, only the relevant components are indicated, and other components such as a gearbox, controller, etc. are not shown. Pressure exerted on the blades 50 of the wind turbine 5 cause the hub 51 or spinner to turn about an axis of rotation A, thus causing the external rotor 3 of the generator 4 to rotate. The external rotor 3 is formed by a field magnet arrangement with permanent magnets 12. The internal stator 2 is formed by a fixed armature, whereby about the internal stator 2 a plurality of coils (not shown in the diagram) is wound. The generator 4 operates as an induction generator, with a current being induced in the coils. The principle of operation of such a generator will be clear to the skilled person and need not be described in detail here.

Because of the large currents (for example in the region of 200-500 Amps for 2-10 MW wind turbines), the windings must be correspondingly dimensioned. For a wind turbine stator, the windings are typically made of stacked metal bars or strips with a cross-section in the region of 20 mm×100 mm. These metal strips are held in stator slots 6 arranged around the outside of the stator 2, which can be up to 3 m in length. Generally, because of the large dimensions (a wind turbine stator 2 can have a diameter in the region of 3 m to 7 m or more), the stator 2 generally comprises a set of stator segments 2a.

Figure 2:
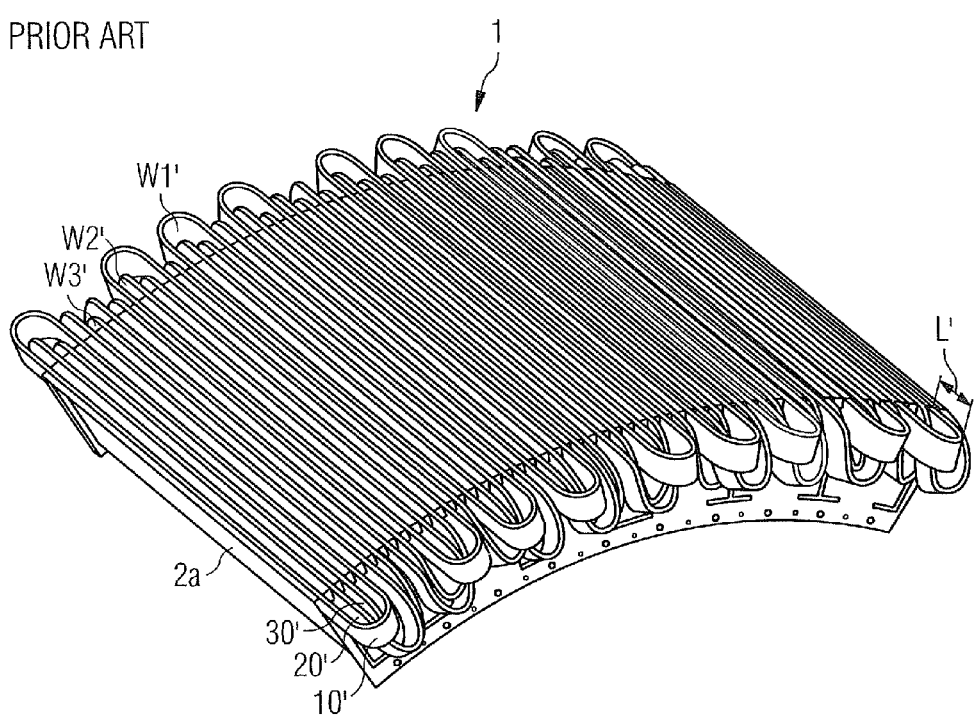
FIG. 2 shows a prior art stator segment.
Figure 3:
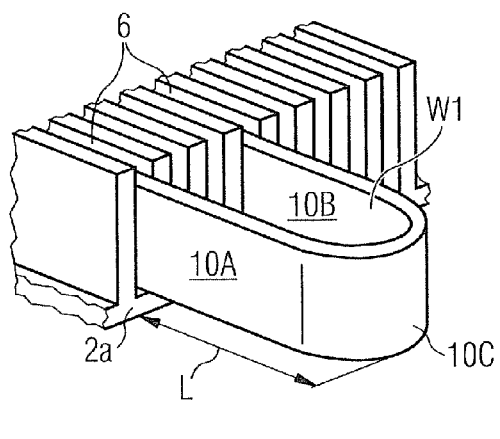
FIG. 3 to 6 shows schematic representations of the end sections of the windings according to the invention.
Figure 4:
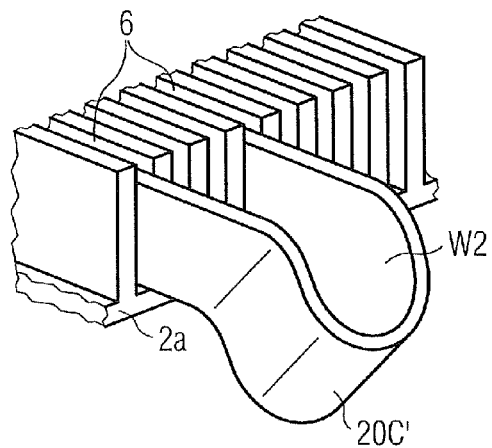
Figure 5:
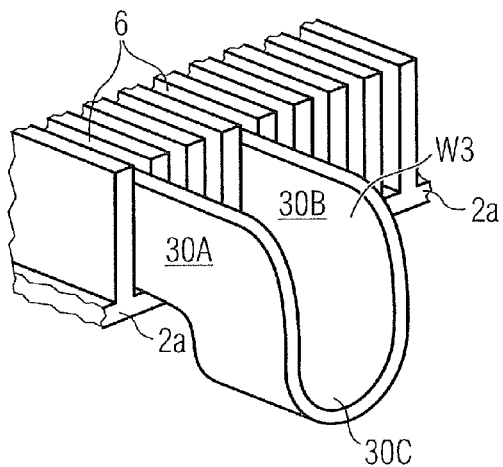

FIG. 2 shows a segment 2a of a stator with an arrangement of windings 10', 20', 30' in a winding scheme 1' as known from prior art. Each winding 10', 20', 30' is shown as a metal strip folded to give a closed loop. Three distinct winding types W1', W2', W3' are shown. A sequence of windings 10', 20', 30' form's coils, whereby a coil sequence comprises each of the different winding types W1', W2', W3' in turn, as will be explained below. Here, the overhang length L' is defined by the foremost end of the winding 10'.

FIGS. 3 to 6 show schematic representations of the end sections 10C, 20C, 20C', 30C of the different winding types W1, W2, W3 according to embodiments of the invention. The end sections 10C, 20C, 20C', 30C protrude in contrast to the body sections 10A, 10B, 20A, 20B, 30A, 30B beyond the slot 6. The length of the end section 10C in the direction of the body sections 10A, 10B parallel to the axis of rotation A defines the overhang length L. For the sake of clarity, each winding is shown on its own, but it is to be understood that windings of different types will be positioned in adjacent stator slots 6 as shown in FIG. 2. The first winding type W1 is essentially a straightforward closed loop W1, and the first end section 10C of this winding type W1 is essentially simply folded back onto itself with a zero-tilt angle. A second winding type W2 has a second end section 20C that does not extend as far beyond the stator end as the first winding type W1. The second end section 20C is tilted away from the axis of rotation, by an up-tilt angle of approximately 90° before being folded back onto itself. According to the embodiment shown in FIGS. 7 and 8 this winding type W2 according to FIG. 6 replaces the winding type W2 according to FIG. 4 which is used in the stator according to FIG. 2. A third winding type W3 has a third end section 30C that also does not extend as far beyond the stator end as the first winding type W1. The third end section 30C is tilted towards the axis of rotation by a down-tilt angle of approximately 90° tilt before being folded back on itself. These different end-sections or overhangs 10C, 20C, 30C allow the windings 10, 20, 30 to be placed or dropped into the slots 6 in a straightforward manner. For example, the stator 2 can be wound by first inserting all windings of the third type W3, then all windings of the second type W2, and finally all windings of the first type W1. Because of the winding end geometries, the windings can be inserted without having to lift or move the previously placed windings. The windings of a particular coil are then electrically connected in a predefined sequence, as will be described with the aid of FIG. 10, for example by joining a conductor of a winding 10, 20, and 30 to a bus-bar.

Figure 7:
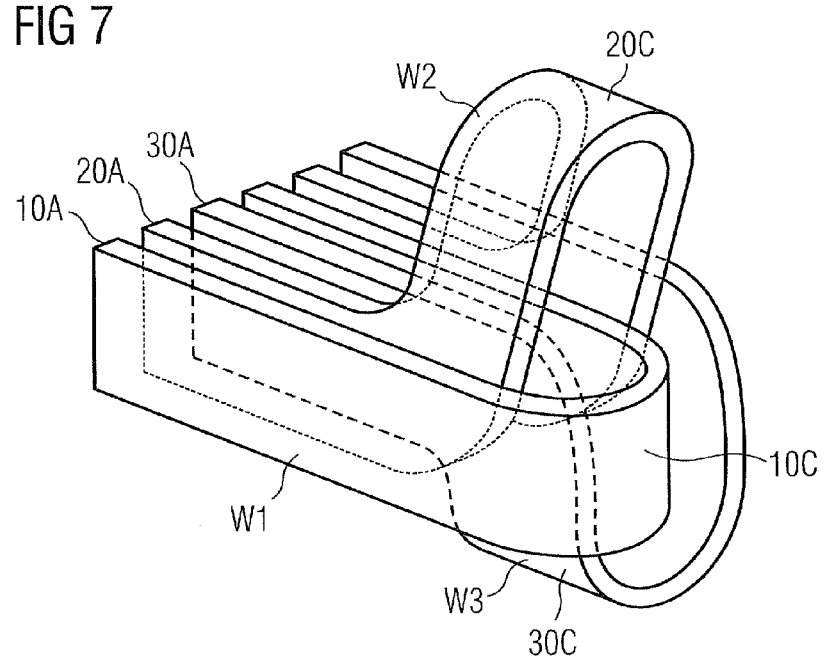
FIG. 7 shows a schematic representation of the overhang design according to the invention.
Figure 8:
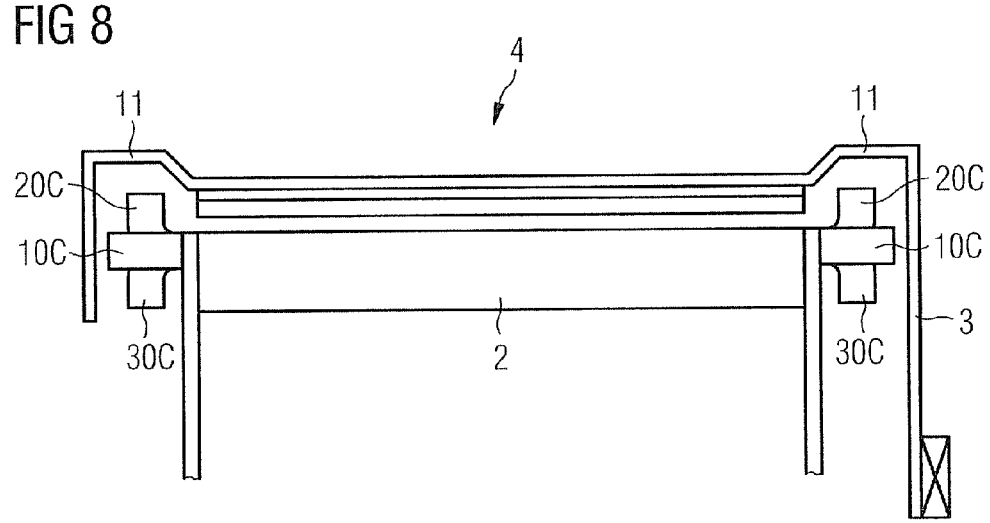
FIG. 8 shows a schematic representation of a first example of an electrical machine according to the invention.
Figure 9:
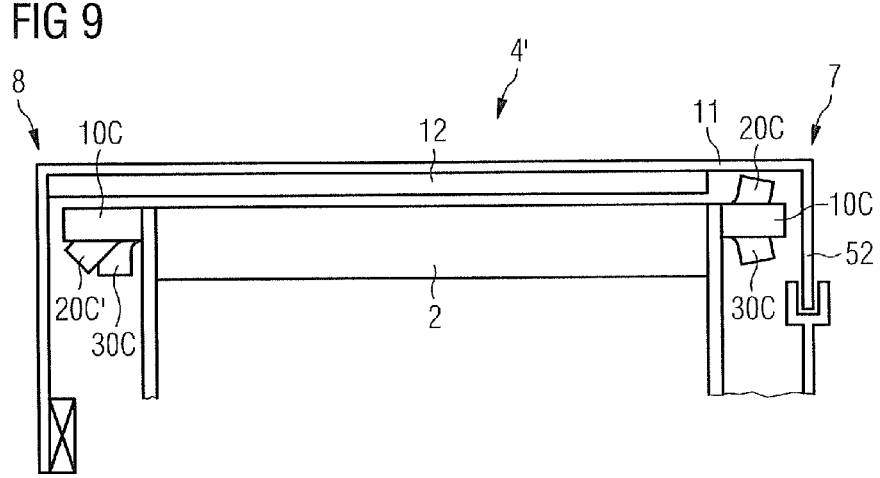
FIG. 9 shows a schematic representation of a second example of an electrical machine according to the invention.

Also, FIG. 7 shows an example of a second end section 20C for an electrical machine 4 as shown in FIG. 8. This embodiment can also be used in conjunction with the end sections 20C' according to FIG. 4 with a 45° bend towards the axis of rotation A as shown in FIG. 9.

In FIG. 8 a first example of a partial cross-section of an electrical machine 4 is shown, for example for a generator of a wind turbine 5. The electrical machine 4 comprises an external rotor 3 surrounding the stator 2.

The external rotor 3 has an essentially cylindrical shape. A plurality of permanent magnets 12 are arranged on a surface of the rotor 3 facing the outer surface of the stator 2. Accordingly the permanent magnets 12 are arranged at a distance d from the axis of rotation A of the rotor 3.

The stator 2 has a smaller diameter than the rotor 3. The body sections 10A, 10B, 20A, 20B, 30A, 30B of the windings are inserted in the slots 6 of the stator 2 in a direction essentially parallel to the axis of rotation A. Therefore the body sections 10A, 10B, 20A, 20B, 30A, 30B of the windings are essentially parallel to the axis of rotation R as well as being parallel to each other.

To accommodate the second end sections 20C that are tilted outward away from the axis of rotation A, recesses 11 are provided at each end 7, 8 of the rotor 3. This allows the air gap between the stator 2 and the rotor 3 to be kept small as possible to decrease air gap losses.

Such an electrical machine 4 can be fabricated by assembling the stator segments within the rotor 3 which can easily have a diameter of several meters.

A second embodiment of an electrical machine 4' for use as the generator of a wind turbine 5 is shown in FIG. 9. Here, the rotor 3 is provided with only a recess 11 at the first end 7 for accommodating the upwardly tilted end sections 20C. On the opposite end 8 of the electrical machine the end sections 10C, 30C, 20C' all tilt downwards, i.e. towards the axis of rotation A. Therefore, at the second end 8 no recess is necessary. Accordingly, the second winding arrangement comprise to different overhang designs at each end 7, 8. This results in a smaller radius of the stator 2 at the second end 8 as at the first end 7. This allows the stator 2 to be first assembled with all windings, which is then inserted into the rotor 3 by simply pushing it through an opening at one end of the rotor 3. A brake disk 52 can then be bolted onto the rotor 3 once the stator 2 is inside. Accordingly, an assembly of stator elements within the rotor 3 or an assembly of the rotor 3 around the completed stator 2 is not necessary.

Figure 6:
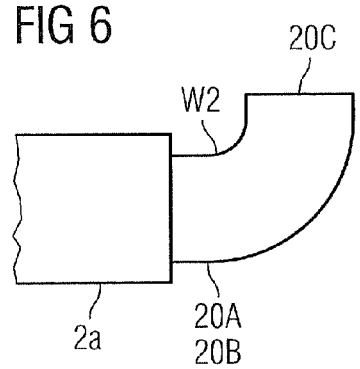
Figure 10:
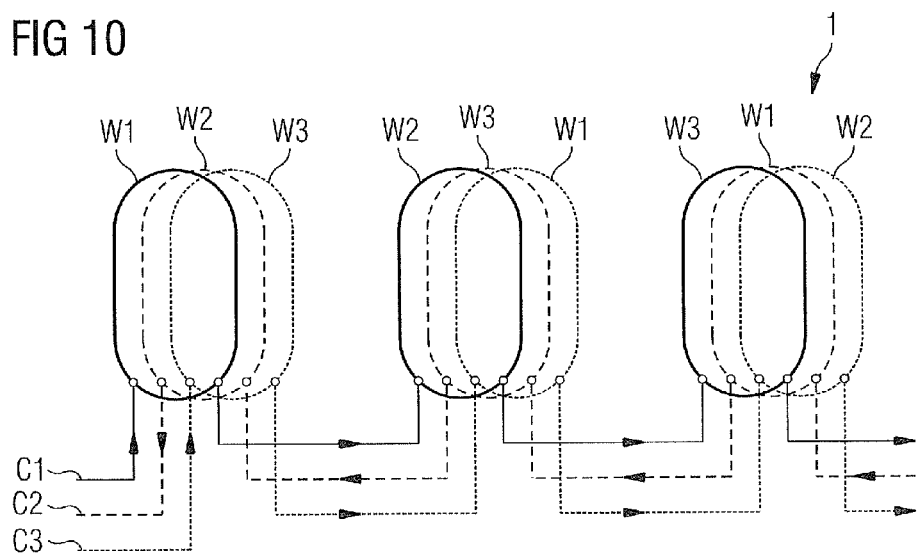
FIG. 10 shows a schematic representation of three coil sequences for a winding according to the invention.

The upper part of FIG. 10 shows a schematic representation of three coil sequences S1, S2, S3 for a winding scheme 1 according to the invention. The order in which the windings are connected are given by the sequences S1, S2, S3 shown in the lower part of the diagram. The first coil winding sequence S1 for the first coil C1 comprises a winding of the first winding type W1, a winding of second winding type W2 and a winding of third winding type W3 in sequence. This pattern repeats for the entire first coil C1. The second coil winding sequence S2 for the second coil C2 comprises a winding of the second winding type W2, a winding of third winding type W3 and a winding of first winding type W1 in sequence. This pattern repeats for the entire second coil C2. The third coil winding sequence S3 for the third coil C3 comprises a winding of the third winding type W2, a winding of first winding type W3 and a winding of second winding type W1 in sequence, and this pattern repeats for the entire third coil C3. In the upper part of the diagram, the arrows indicate the current flow direction in the different coils C1, C2, C3 (so that the 'go' winding sections of the first and third coils C1, C3 occupy slots on either side of the slot containing the 'return' winding section of the second coil C2; while the 'return' winding sections of the first and third coils C1, C3 occupy slots on either side of the slot containing the 'go' winding section of the second coil C2). Since each coil C1, C2, C3 comprises a sequence S1, S2, S3 in which the winding types W1, W2, W3 appear essentially equally often, the overall lengths of the coils C1, C2, C3 are also essentially equal. In this way, the winding arrangement reduces or effectively eliminates load imbalances while at the same time reducing the amount of metal required for the windings. Although the windings are indicated here as closed loops, the windings of the winding scheme 1 could equally well be realised to be open at both ends, and the connections could be made by bus-bars at both ends of the stator. The second winding type W2 could comprise end sections 20C both tilted outwards, i.e. away from the axis of rotation A as shown in FIG. 6. Alternatively, second end winding type W2 could comprise second end sections 20C with a 90° tilt at one end and second end sections with 20C' with a 45° tilt an the second end. Accordingly, the end sections 10C, 20C, 30C at the first 7 or at both ends 7, 8 could forming winding arrangement with a series of up/zero/down or /down/zero/up tilts, for example 90°/0°/−90° or −90°/0°/90° tilts.

Although the present invention has been disclosed in the form of preferred embodiments and variations thereon, it will be understood that numerous additional modifications and variations could be made thereto without departing from the scope of the invention. For example, the hub of the wind turbine can turn a drive shaft connected to a gearbox, which can be realised to turn the stator of a generator at a speed that is more suitable for generating electricity for a power grid.

For the sake of clarity, it is to be understood that the use of "a" or "an" throughout this application does not exclude a plurality, and "comprising" does not exclude other steps or elements.

The invention claimed is:

1. An electrical machine, comprising:
an armature,
a field magnet arrangement, wherein the armature and the field magnet arrangement are separated by a gap from each other, wherein the armature and/or the field magnet arrangement comprises a plurality of coils, wherein each coil comprises conductive body sections, wherein the body sections of the coils are joined electrically by conductive end sections, wherein each end section is symmetrical with respect to a plane passing axially through the winding end section, wherein
at a first end of the armature a first end section of a first coil of the armature is tilted in a first direction away from the armature by a first angle in respect to the body section of the first coil of the armature, at the first end of the armature a first end section of a second coil of the armature is tilted in a first direction away from the armature by a second angle in respect to the body section of the second coil, at the first end of the armature a first end section of a third coil of the armature is tilted in a first direction away from the armature by a third angle in respect to the body section of the third coil, each of the first, second, and third angles different from other ones of the first, second, and third angles, wherein the first direction away from the armature is toward or away from the field magnet arrangement,
and
at a first end of the field magnet arrangement a first end section of a first coil of the field magnet arrangement is tilted in a direction away from the field magnet arrangement towards the armature by a fourth angle in respect to the body section of the first coil of the field magnet arrangement, at the first end of the field magnet arrangement a first end section of a second coil of the field magnet arrangement is tilted in a direction away from the field magnet arrangement towards the armature by a fifth angle in respect to the body section of the second coil of the field magnet arrangement, at a first end of the field magnet arrangement a first end section of a third coil of the field magnet arrangement is tilted in a direction away from the field magnet arrangement towards the armature by a sixth angle in respect to the body section of the third coil of the field magnet arrangement, the fourth, fifth and sixth angles different from other ones of the fourth, fifth and sixth angles.

2. The electrical machine according to claim 1, wherein one of the first, second and third angles is zero, and/or one of the fourth, fifth and sixth angles is zero.

3. The electrical machine according to claim 1, wherein
at a second end of the armature, the first coil of the armature comprises a second end section tilted in a second direction away from the armature by one of the first, second and third angles;
and/or
at a second end of the field magnet arrangement, the first coil of the field magnet arrangement comprises a second end section tilted in a direction away from the armature by one of the fourth, fifth and sixth angles; and
wherein the second direction away from the armature is toward or away from the field magnet arrangement.

4. The electrical machine according to claim 1, wherein the second end section and the third end section are tilted with the same amount of angle in respect to the respective body section, the second end section tilted in a direction towards the field magnet arrangement and the third end section tilted in a direction away from the field magnet arrangement.

5. The electrical machine according to claim 1, wherein the first end section of the first coil is essentially in line with its body sections.

6. The electrical machine according to claim 1, wherein the angle subtended between the second end section and its second body section is essentially 90°.

7. The electrical machine according to claim 1, wherein the angle subtended between the third end section and its third body section is essentially −90°.

8. The electrical machine according to claim 1, wherein the armature and/or field magnet arrangement comprises at least one recess for accommodating at least one end section.

9. The electrical machine according to claim 1, wherein the armature has a first end and a second end, and the coils are arranged axially on an outside surface of the armature,
such that one end section of a coil extending beyond the first end of the armature is tilted in a direction away from the armature towards the field magnet arrangement, and
such that the other end section of the same coil extending beyond the second end of the armature is tilted in a direction away from the field arrangement or has no tilt.

10. The electrical machine according to claim 9, wherein the angle subtended between the second end section extending beyond the second end of the armature and its body sections is essentially 45°.

11. The electrical machine according to claim 1, wherein the field magnet arrangement is an external rotor and the armature is an internal stator.

12. The electrical machine according to claim 1, wherein the electrical machine is an electrical generator.

13. A wind turbine, comprising:
a rotor rotatable by a wind turbine blade, and
an electrical machine rotatably connected to the rotor, wherein the electrical machine is in accordance with claim 1.

14. A method for generating electrical power, comprising:
rotatably coupling the electrical machine of claim 1 to the rotor of a wind turbine, and
rotating the rotor via pressure exerted on a wind turbine blade, to operate the electrical machine to generate electrical power.

* * * * *